(12) United States Patent
Kushner et al.

(10) Patent No.: US 6,633,839 B2
(45) Date of Patent: Oct. 14, 2003

(54) METHOD AND APPARATUS FOR SPEECH RECONSTRUCTION IN A DISTRIBUTED SPEECH RECOGNITION SYSTEM

(75) Inventors: William M. Kushner, Arlington Heights, IL (US); Jeffrey Meunier, Chicago, IL (US); Mark A. Jasiuk, Chicago, IL (US); Tenkasi V. Ramabadran, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 354 days.

(21) Appl. No.: 09/775,951

(22) Filed: Feb. 2, 2001

(65) Prior Publication Data

US 2002/0147579 A1 Oct. 10, 2002

(51) Int. Cl.$^7$ ................................................ G10L 15/00
(52) U.S. Cl. ........................ 704/205; 704/206; 704/207
(58) Field of Search ................................ 704/203, 207, 704/204, 216, 217, 231, 236, 255, 254, 205, 206

(56) References Cited

U.S. PATENT DOCUMENTS

| | | | |
|---|---|---|---|
| 5,247,579 A | | 9/1993 | Hardwick |
| 5,596,676 A | | 1/1997 | Swaminathan et al. |
| 5,625,749 A | * | 4/1997 | Goldenthal et al. .......... 704/254 |
| 5,749,073 A | * | 5/1998 | Slaney ........................ 704/278 |
| 5,751,903 A | | 5/1998 | Swaminathan et al. |
| 5,822,729 A | * | 10/1998 | Glass ........................ 704/255 |
| 5,890,111 A | * | 3/1999 | Javkin et al. ................ 704/226 |
| 5,918,223 A | | 6/1999 | Blum et al. |
| 5,924,065 A | * | 7/1999 | Eberman et al. ............. 704/231 |
| 6,173,260 B1 | | 1/2001 | Slaney |
| 6,199,041 B1 | | 3/2001 | Liu et al. |
| 6,278,970 B1 | * | 8/2001 | Milner ........................ 704/203 |
| 6,314,392 B1 | * | 11/2001 | Eberman et al. ............. 704/217 |
| 6,377,916 B1 | | 4/2002 | Hardwick |

\* cited by examiner

Primary Examiner—Susan McFadden (57) ABSTRACT

In a distributed speech recognition system comprising a first communication device which receives a speech input (34), encodes data representative of the speech input, and transmits the encoded data and a second remotely-located communication device which receives the encoded data and compares the encoded data with a known data set, the device including a processor with a program which controls the processor to operate according to a method of reconstructing the speech input including the step of receiving encoded data including encoded spectral data and encoded energy data. The method further includes the step of decoding the encoded spectral data and encoded energy data to determine the spectral data and energy data. The method also includes the step of combining the spectral data and energy data to reconstruct the speech input.

22 Claims, 5 Drawing Sheets

FIG. 7

METHOD AND APPARATUS FOR SPEECH RECONSTRUCTION IN A DISTRIBUTED SPEECH RECOGNITION SYSTEM

FIELD OF THE INVENTION

The present invention is directed to a method and apparatus for speech reconstruction, and, in particular, a method and apparatus for speech reconstruction in a distributed speech recognition system.

BACKGROUND OF THE INVENTION

Automatic speech recognition (ASR) is the method of automatically recognizing the nature of oral instructions based on the information included in speech waves. ASR has ushered in a new generation of security devices based on oral, rather than physical, keys and has made possible a whole range of "no-hands" or "hands-free" features, such as voice dialing and information retrieval by voice.

At the highest level, all ASR systems process speech for feature extraction (also known as signal-processing front end) and feature matching (also known as signal-processing back end). Feature extraction is the method by which a small amount of data is extracted from a speech input to represent the speech input. Feature matching is the method by which the nature of instructions contained in the speech input are identified by comparing the extracted data with a known data set. In a standard ASR system, a single processing unit carries out both of these functions.

The performance of an ASR system that uses speech transmitted, for example, over a mobile or wireless channel as an input, however, may be significantly degraded as compared with the performance of an ASR system that uses the original unmodified speech as the input. This degradation in system performance may be caused by distortions introduced in the transmitted speech by the coding algorithm as well as channel transmission errors.

A distributed speech recognition (DSR) system attempts to correct the system performance degradation caused by transmitted speech by separating feature extraction from feature matching and having the two methods executed by two different processing units disposed at two different locations. For example, in a DSR mobile or wireless communications system or network including a first communication device (e.g., a mobile unit) and a second communication device (e.g., a server), the mobile unit performs only feature extraction, i.e., the mobile unit extracts and encodes recognition features from the speech input. The mobile unit then transmits the encoded features over an error-protected data channel to the server. The server receives the encoded recognition features, and performs only feature matching, i.e., the server matches the encoded features to those in a known data set.

With this approach, coding distortions are minimized, and transmission channel errors have very little effect on the recognition system performance. Moreover, the mobile unit has to perform only the relatively computationally inexpensive feature extraction, leaving the more complex, expensive feature matching to the server. By reserving the more computationally complex activities to the server processor, greater design flexibility is preserved for the mobile unit processor, where processor size and speed typically are at a premium given the recent emphasis on unit miniaturization.

The European Telecommunications Standards Institute (ETSI) recently published a standard for DSR feature extraction and compression algorithms. European Telecommunications Standards Institute Standard ES 201 108, *Speech Processing, Transmission and Quality aspects (STQ); Distributed speech recognition; Front-end feature extraction algorithm; Compression algorithms*, Ver. 1.1.2, April 2000 (hereinafter "ETSI Standard"), hereby incorporated by reference in its entirety. While several methods, such as Linear Prediction (LP), exist for encoding data from a speech input, the ETSI Standard includes a feature extraction algorithm that extracts and encodes the speech input as a log-energy value and a series of Mel-frequency cepstral coefficients (MFCC) for each frame. These parameters essentially capture the spectral envelope information of the speech input, and are commonly used in most large vocabulary speech recognizers. The ETSI Standard further includes algorithms for compression (by vector quantization) and error-protection (cyclic redundancy check codes). The ETSI standard also describes suitable algorithms for bit stream decoding and channel error mitigation. At an update interval of 10 ms and with the addition of synchronization and header information, the data transmission rate works out to 4800 bits per second.

In summary, a DSR system, such as one designed in accordance with the ETSI Standard, offers many advantages for mobile communications network implementation. Such a system may provide equivalent recognition performance to an ASR system, but with a low complexity front-end that may be incorporated in a mobile unit and a low bandwidth requirement for the transmission of the coded recognition features.

DSR systems have the drawback that the original speech input is not available at the back end for storage and/or verification purposes. It would be helpful to have the original speech input available for: (i) back end applications that require human assistance, e.g., to permit hand correction of documents generated using remote dictation systems by allowing comparison of the document to the original speech input or to permit smooth transition when a recognition task is handed over from a DSR system to a human operator; (ii) prophylactic storage of legally sensitive information, e.g., to record the exact statements made during financial transactions such as the placement of a securities order; and (iii) validation of utterances during database collection, e.g., for training the recognizer in batch mode (and especially incremental mode) and system tune-up.

On the other hand, original speech is available at the back end if a standard ASR system is used. However, as noted above, ASR has significant distortion difficulties when used in a mobile or wireless application. That is, coded speech at the desired bit rate of around 4800 bps significantly degrades the performance of the recognizer. Alternatively, a separate high quality speech coder could be provided, but this would require a significant increase in bandwidth.

DETAILED DESCRIPTION OF THE EMBODIMENTS

According to embodiments of the present invention, a method and an apparatus for speech reconstruction are provided. In particular, in a distributed speech recognition system comprising a first communication device which receives a speech input, encodes data representative of the speech input, and transmits the encoded data and a second remotely-located communication device which receives the encoded data and compares the encoded data with a known data set, a method of reconstructing the speech input at the second communication device includes the step of receiving encoded data including encoded spectral data and encoded energy data. The method further includes the step of decoding the encoded spectral data and encoded energy data to determine the spectral data and energy data. The method also includes the step of combining the spectral data and energy data to reconstruct the speech input. The apparatus according to an embodiment of the present invention includes a processor with a program which controls the processor to receive and decode the encoded data, and a speech synthesizer which combines the decoded data to reconstruct the speech input.

Figure 1:
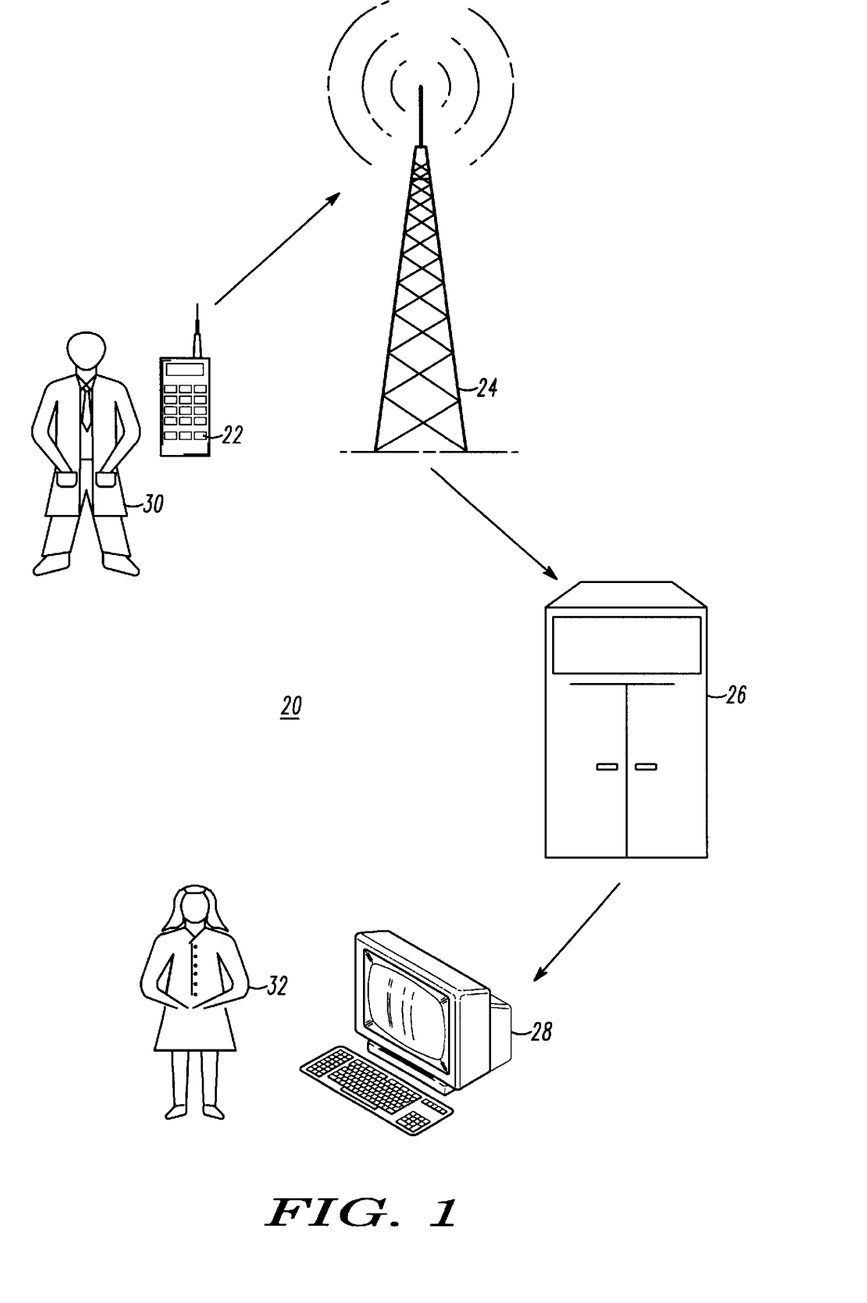
FIG. 1 is a schematic diagram of a distributed speech recognition system using speech encoding and speech reconstruction methods according to an embodiment of the present invention.

FIG. 1 shows a communication network or system 20, and in particular a mobile or wireless radio frequency communication system. Although the system 20 shown is a mobile or wireless radio frequency communication system, the system 20 could be any type of communication system, for example a wired or wireline system or a system using a method of communication other than radio frequency communication.

The system 20 includes a mobile communications device 22 (such as a mobile station) and a fixed communications device 24 (such as a base station), the mobile device 22 communicating with the fixed device 24 through the use of radio frequency transmissions. The fixed device 24, in turn, communicates with a server 26 over a wired connection, as does the server 26 with a remote site 28. Using such a system 20, a user 30 can communicate with the remote site 28, and optionally with a user 32 associated with the remote site 28.

While only one mobile device 22, fixed device 24, server 26, and remote site 28 are shown in FIG. 1, it will be recognized that the system 20 may, and typically does, include a plurality of mobile devices 22 communicating with a plurality of fixed devices 24, the fixed devices 24 in turn being in communication with a plurality of servers 26 in communication with a plurality of remote sites 28. For ease of illustration, a single mobile device 22, fixed device 24, server 26 and remote site 28 have been shown, but the invention described herein is not limited by the size of the system 20 shown.

Figure 2:
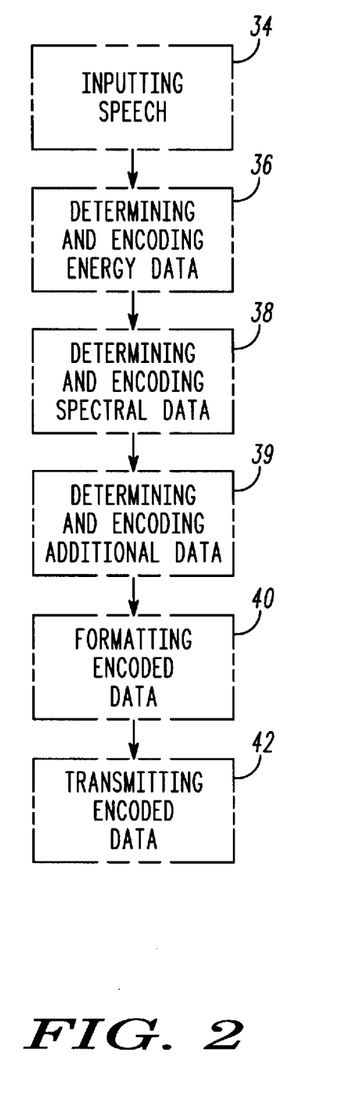
FIG. 2 is a flow chart illustrating the speech encoding method according to an embodiment of the present invention used in the system of FIG. 1.

The system 20 is a distributed speech recognition system, i.e., the mobile device 22 performs feature extraction and the server 26 performs feature matching. The system 20 also uses an embodiment of the present invention to provide reconstructed speech at the server 26 for storage and/or verification. In particular, the method used by the mobile device 22 to extract recognition features and thereby encode a speech input is shown in FIG. 2. Similarly, the method used by the server 26 to reconstruct the speech signal is shown in FIG. 3.

As shown in FIG. 2, the mobile device 22 receives a speech input at a step 34. The mobile device 22 determines and encodes data representative of the energy of the speech input at a step 36. At a step 38, the mobile device 22 determines and encodes a data representative of the spectrum of the speech input, using, for example, LP parameters, MFCC or some other method. At a step 39, the mobile device 22 may optionally determine and encode other data about the speech input, such as class and pitch period data. The data determined at blocks 36, 38 and (optionally) 39 is combined for transmission at a step 40. The combined encoded signal is transmitted from the mobile device 22 to the fixed device 24 at a step 42 in FIG. 2, and is subsequently transmitted from the fixed device 24 received by the server 26 at a step 44 in FIG. 3.

Figure 3:
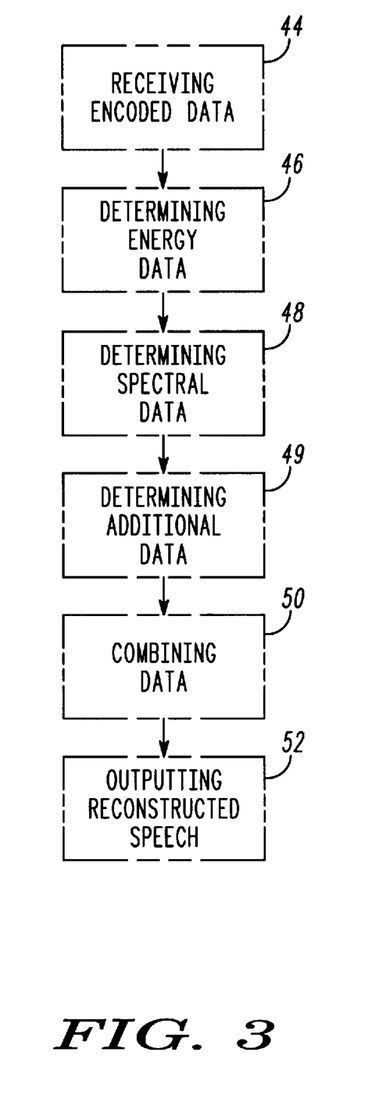
FIG. 3 is a flow chart illustrating the speech reconstruction method according to an embodiment of the present invention used in the system of FIG. 1.

As also shown in FIG. 3, the server 26 decodes and determines the energy data at a step 46. The server 26 also decodes and determines the spectral data at a step 48. The server 26 may also optionally decode and determine other data regarding the speech input from the transmission at a step 49. The server 26 combines the energy data and the spectral data determined at steps 46, 48 with additional speech data determined at the step 49 at a step 50 to reconstruct the speech input received at the step 34. The reconstructed speech is outputted at a step 52.

Using this system 20, a reconstructed form of the speech input is available at the server 26 in addition to the encoded form of the speech input, and may be communicated along to the remote site 28. This reconstructed form of the speech input may be used, for example, by the user 32 to check a document generated by a remote dictation system. Moreover, by using primarily the encoded speech signal generated by the mobile device 22 for the reconstruction of the speech input, the reconstructed speech is made available at the remote site 28 without significantly increasing the bandwidth of the transmission channel between the mobile device 22 and the fixed device 24.

The detailed structure of devices 22, 26 and the detailed methods of encoding and speech reconstruction are now explained with reference to FIGS. 4–7.

Figure 4:
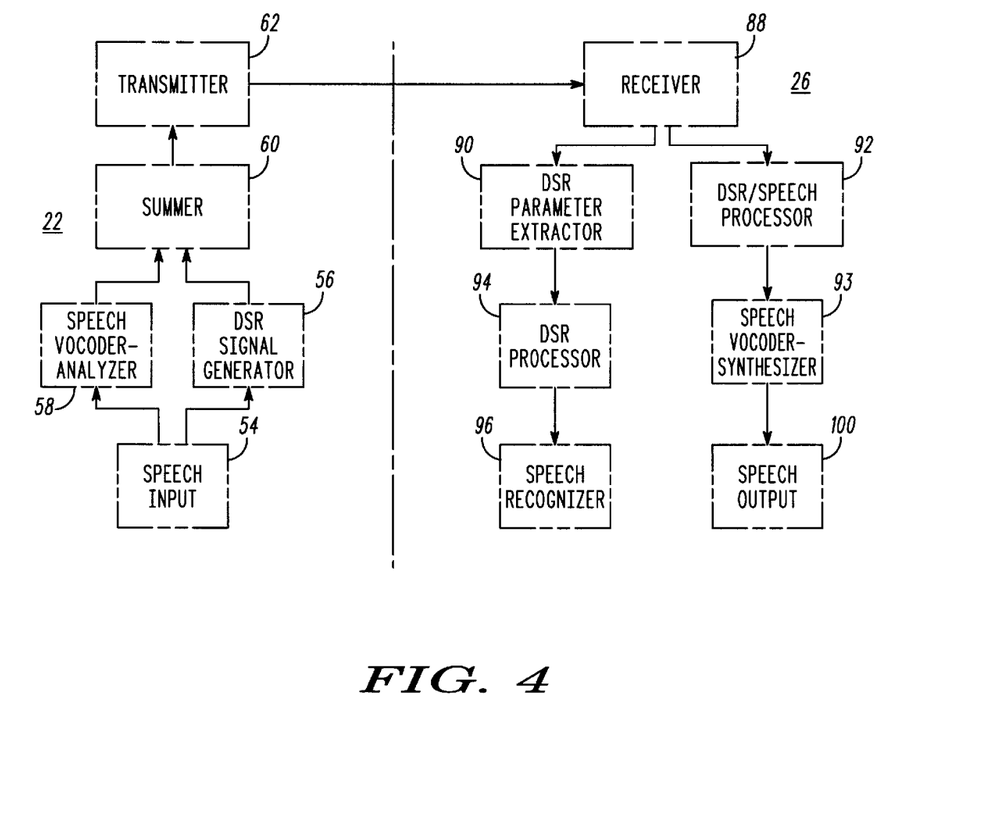
FIG. 4 is a schematic diagram of apparatuses which encode speech and reconstruct speech according to an embodiment of the present invention.

The detailed structure of the mobile device 22 is shown in the left-half of FIG. 4. The mobile device 22 includes a speech input device 54 (such as a microphone), which is coupled to a DSR signal generator 56 and a speech vocoder-analyzer 58. The DSR signal generator 56 extracts the spectral data about the speech input received via the speech input device 54, and generates a coded signal which is representative of the spectral data. The vocoder-analyzer 58 extracts additional data about the speech input which may be used to reconstruct the speech at the back end.

A summer 60 combines the coded signal from the DSR signal generator and the additional data extracted by the vocoder-analyzer 58 into a unified signal, which is passed to a transmitter 62 coupled to the summer 60. In the embodiment of the system 20 shown in FIG. 1, the transmitter 62 is a radio frequency transmitter or transceiver, although as the method according to the present invention could be used with other types of communication systems, in which case the transmitter would be selected to be compatible with whatever system is selected.

Figure 5:
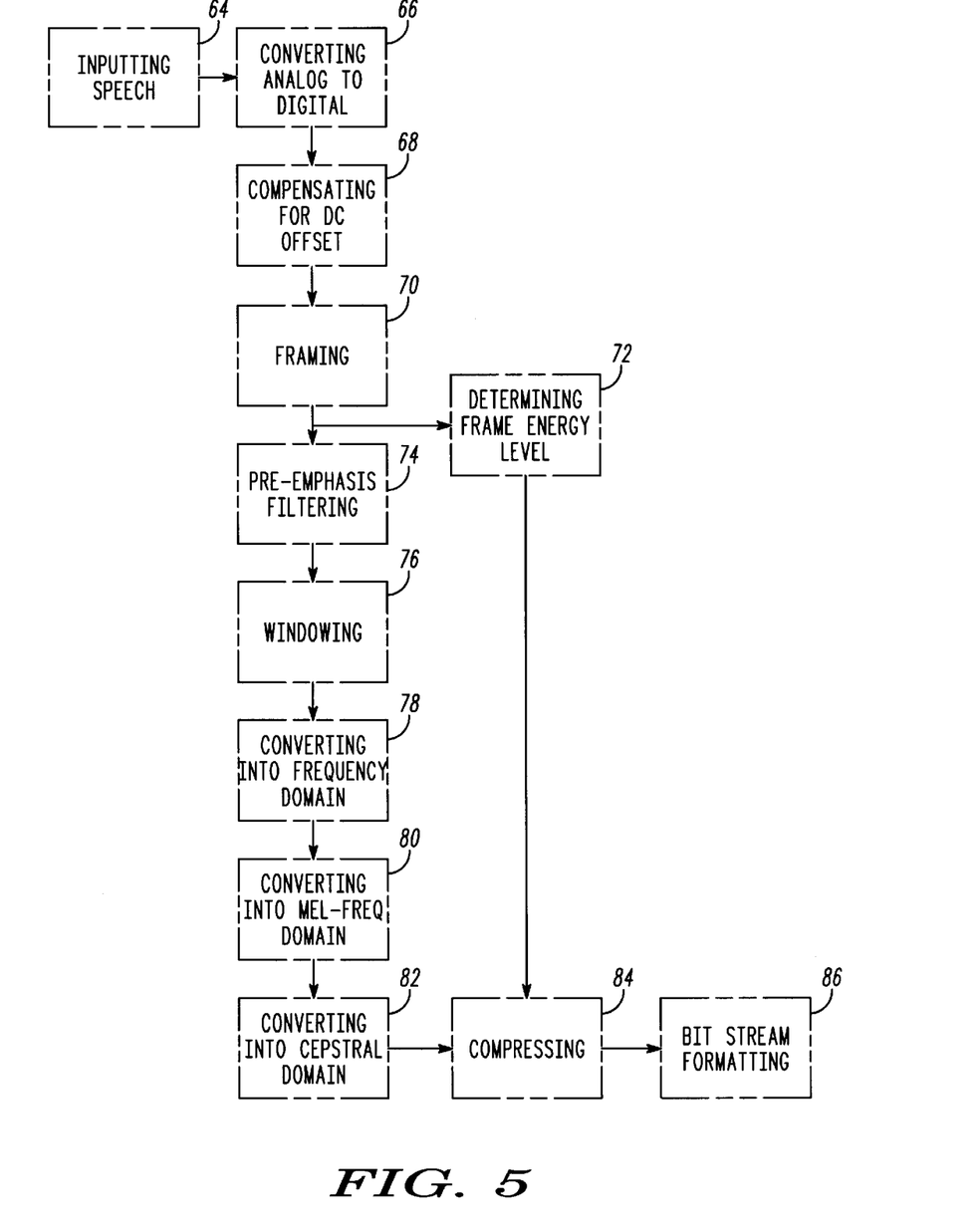
FIG. 5 is a flow chart illustrating the speech encoding method used by the speech encoding apparatus of FIG. 4.

The method of operation of the DSR signal generator 56 is now explained with reference to FIG. 5. At a step 64, the speech input is received by the DSR signal generator 56. The speech input is converted from analog to digital at a step 66, for example at a sampling frequency ($F_s$) of 8000 samples/second and 16 bits/sample. The digitized speech is passed through a DC-offset removal filter at a step 68, and divided into overlapping frames at a step 70. Frame size is dependant on the sampling frequency. For the ETSI Standard, which accommodates three different sampling frequencies of 8, 11, and 16 kHz, the possible frame sizes are 200, 256, and 400 samples, respectively.

At this point, at a step 72, the frame energy level is computed and its natural logarithm is determined. The resultant value is also referred to as the log-energy value.

The framed, digitized speech signal is then passed through a pre-emphasis filter at a step 74 to emphasize the higher frequency components. Each speech frame is then windowed (e.g., using a Hamming window) at a step 76, and transformed into the frequency domain at a step 78 using a Fast Fourier Transform ("FFT"). Similar to the frame size, the size of the FFT used depends on the sampling frequency, for example a 256-point FFT is used for 8 and 11 kHz sampling frequencies and a 512-point FFT is used for a 16 KHz sampling frequency.

The FFT magnitudes in the frequency range between 64 Hz and $F_s/2$ (for example, 4 kHz for a sampling frequency of 8 kHz) are then transformed into the Mel-frequency domain by a process known as Mel-filtering. A transformation into the Mel-frequency domain is performed because psychophysical studies have shown that human perception of the frequency contents of sounds for speech signals does not follow a linear scale. Accordingly, for each tone with an actual frequency, f, measured in Hz, a subjective pitch may be represented on a second scale, which is referred to as the Mel-frequency scale.

The Mel-filtering process occurring at a step 80 is as follows. First, the frequency range (e.g., 64 Hz to 4000 Hz) is warped into a Mel-frequency scale using the expression:

$$Mel(f) = 2595.0 * \log_{10}\left(1 + \frac{f}{700.0}\right)$$

Using this equation, the Mel-frequencies corresponding, for example, to frequencies of 64 Hz and 4000 Hz are 98.6 and 2146.1, respectively. This Mel-frequency range is then divided into 23 equal-sized, half-overlapping bands (also known as channels or bins), each band 170.6 wide and the center of each band 85.3 apart. The center of the first band is located at 98.6+85.3=183.9, and that of the last band is located at 2146.1−85.3=2060.8. These bands of equal size in the Mel-frequency domain correspond to bands of unequal sizes in the linear frequency domain with the size increasing along the frequency axis. The FFT magnitudes falling inside each band are then averaged (filtered) using a triangular weighting window (with the weight at the center equal to 1.0 and at either end equal to 0.0). The filtered band outputs are then subjected to a natural logarithm operation.

The 23 log-spectral values generated at the step 80 are then transformed into the cepstral domain by means of a 23-point DCT (Discrete Cosine Transform) at a step 82. Only the first 13 values (C0 through C12) are calculated, with the remaining ten values (C13 through C22) being discarded, i.e., not computed. The frame log-energy calculated at the step 72 and the 13 cepstral values (also referred to as Mel-Frequency Cepstral Coefficients, or MFCCs) calculated at the step 82 are then compressed (quantitized) at a step 84 and transmitted to the fixed device 24 at a step 86. For a system 20 operating according to the ETSI Standard, the MFCC and log-energy values are updated every 10 ms.

As mentioned above, the vocoder-analyzer 58 also receives the speech input. In particular, the vocoder-analyzer 58 analyzes the input to determine other data about the speech input which may be used by the server 26 in addition to the data derivable from the DSR-coded speech to reconstruct the speech. The exact data extracted by the vocoder-analyzer 58 is dependent upon the characteristics of the speech vocoder associated with the server 26 which will be synthesizing the reconstructed speech. For example, Code Excited Linear Predictive (CELP) vocoders require codebook indices for each sub-frame of speech to be prepared. For parametric vocoders (e.g., sinusoidal vocoders), additional excitation data may be required, such as the class (voiced, unvoiced, etc.) and the pitch period as well as higher-resolution energy data such as the sub-frame energy levels.

One will recognize that the quality of speech synthesized by CELP coders falls rapidly when the bit rate is reduced below about 4800 bps. On the other hand, parametric vocoders provide reasonable speech quality at lower bit rates. Since one of the main requirements of a DSR system is low data transmission rate, a parametric vocoder, specifically a sinusoidal vocoder, will be typically used in the server 26. Consequently, according to a preferred embodiment of the invention, the speech vocoder-analyzer 58 determines class, pitch period and sub-frame energy data for each speech frame, although optionally the sub-frame energy data may be omitted because the sub-frame energies may be computed by interpolation from the log-energy value.

The vocoder-analyzer 58 preferably operates on a frame size of approximately 20 ms, i.e., the parameters are transmitted once every 20 ms. In each frame, 2 bits are used for the class parameter, i.e., to indicate whether a frame is non-speech, voiced, unvoiced, mixed-voiced, etc. The speech/non-speech classification is preferably done using an energy-based Voice Activity Detector (VAD), while the determination of voicing level is based on a number of features including periodic correlation (normalized correlation at a lag equal to a pitch period), aperiodic energy ratio (ratio of energies of decorrelated and original frames), and high-frequency energy ratio. The pitch period parameter, which provides information about the harmonic frequencies, can typically be represented using an additional 7 bits for a typical pitch frequency range of about 55 Hz to 420 Hz. The pitch period is preferably estimated using a time-domain correlation analysis of low-pass filtered speech. If the higher-resolution energy data, e.g., sub-frame energy, parameter is to be transmitted, this may be accomplished using an additional 8 bits. The sub-frame energies are quantized in the log-domain by a 4-dimensional VQ, with the energy for non-speech and unvoiced speech frames computed over a sub-frame (4 sub-frames per frame) and the energy for voiced frames computed over a pitch period. As an alternative, the sub-frame energies may be combined with the log-energy value to reduce the bit rate.

Assuming that class, pitch period, and sub-frame energy values are transmitted every 20 ms, i.e., once for every two DSR frames if an ETSI Standard system is used, approximately 800 to 850 bps will be added to the data transmission rate. If the additional energy data is not transmitted, as little as 450 bps may be added to the data transmission rate.

The detailed structure of the server 26 is now discussed with reference to the right-half of FIG. 4. A receiver 88 is coupled to a conventional DSR parameter extractor 90 and a DSR/speech processor 92 according to an embodiment of the present invention. The DSR parameter extractor 90 is coupled to a conventional DSR processor 94 and a conventional speech recognizer 96 to compare the encoded data with a known data set, while the DSR/speech processor 92 is coupled to a speech vocoder-synthesizer 98 (as indicated previously, preferably a sinusoidal speech vocoder-synthesizer) and a speech output (e.g., speaker) 100.

Figure 6:
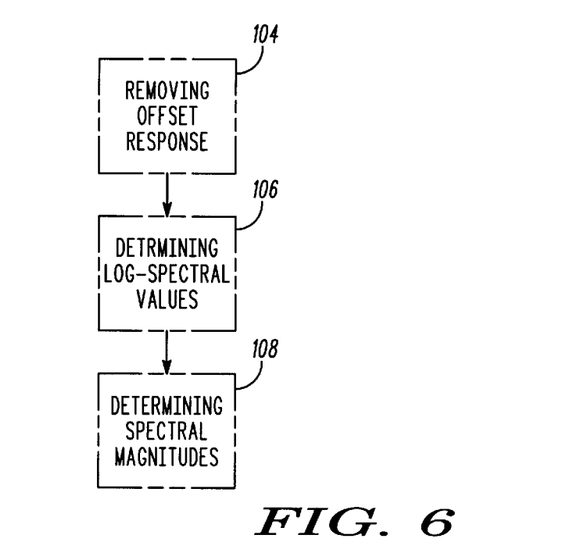
FIG. 6 is a flow chart illustrating the speech excitation determination method used by the speech reconstruction apparatus of FIG. 4.

Referring to FIG. 6, the DSR/speech processor 92 includes a program which controls the DSR/speech processor 92 to determine and decode the DSR-encoded spectral data, and in particular the harmonic magnitudes, as follows. At a step 104, the MFCC values corresponding to the impulse response of the pre-emphasis filter are subtracted from the received MFCC values to remove the effect of the pre-emphasis filter as well as the effect of the Mel-filter. Then, at a step 106, the MFCC values are inverted to compute the log-spectral value for each desired harmonic frequency. The log-spectral values are then exponentiated at a step 108 to get the spectral magnitude for the harmonics. Typically, these steps are performed every 20 ms, although the calculations may be made more frequently, e.g., every 10 ms.

Figure 7:
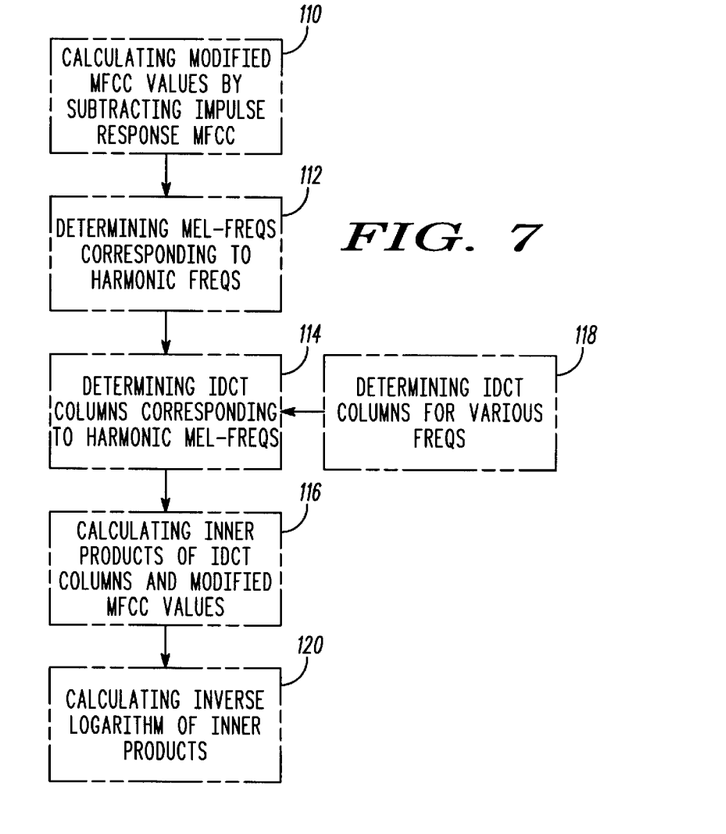
FIG. 7 is a flow chart also illustrating the speech excitation determination method used by the speech reconstruction apparatus of FIG. 4.

FIG. 7 shows the operation of the DSR/speech program in greater detail. At a step 110, as indicated above, the MFCC values corresponding to the impulse response of the pre-emphasis filter are subtracted from the received MFCC values principally to remove the effect of the pre-emphasis filter. Alternatively, the effect of the pre-emphasis filter may be removed as a last step by dividing the spectral magnitude of the harmonic frequency by the impulse response of the pre-emphasis filter at that corresponding harmonic frequency. However, in addition to the pre-emphasis filter, the Mel-filter emphasizes higher frequencies because of the increasing width of the frequency bands along the linear frequency axis. The Mel-filter impulse response at any band center can be taken to be the width of the corresponding band, and for any other frequency, an interpolated value can be used. By computing a combined impulse response of the pre-emphasis filter and the Mel-filter, the effect of both filters can be removed in a single step by dividing the spectral magnitude of the harmonic frequency by the combined impulse response at that corresponding harmonic frequency. The step 110 achieves the same result.

The modified MFCC values with the effect of the pre-emphasis filter and the Mel-filter removed are then used to estimate the spectral magnitudes according to the following steps. The Mel-frequencies corresponding to the harmonic frequencies (derivable from the pitch period) are determined at a step 112. An inverse discrete cosine transform (IDCT) is then performed on the modified MFCC values at the harmonic Mel-frequencies to transform the cepstral coefficients into log-spectral values at steps 114, 116.

That is, a 23-point IDCT of the MFCC values C0 through C12 (assuming C13 through C22 are zeros) would restore the original 23 log-spectral values except for the distortion caused by truncation of the cepstral sequence and quantization. These log-spectral values correspond, however, to the centers of the 23 frequency bands. The log-spectral values at other frequencies are required to determine the transformed MFCC values for the harmonic frequencies.

To increase the sampling resolution, the IDCT size can be increased by an odd multiple of 23, that is (2K+1)*23, where K>0. This introduces K additional Mel-frequency points on either side of the 23 original Mel-frequencies corresponding to the centers of the frequency bands. For example, if K=85, there are 85 additional Mel-frequency points to the left of the first frequency band center and to the right of the last (i.e., $23^{rd}$) frequency band center, and 170 additional Mel-frequency points between any two consecutive frequency band centers. The total number of Mel-frequency points, in this case, is 171*23=3933. For $F_s$=8000 Hz, the centers of the frequency bands are 85.3 apart in Mel-frequency scale, and the choice of K=85 increases the resolution such that consecutive Mel-frequency points are only 85.3/171=0.499 apart. It is important to note that the leftmost and rightmost Mel-frequency points of the IDCT do not correspond to 0 and $F_s/2$ (e.g., 4000 Hz) in linear frequency scale. For our example, the leftmost Mel-frequency point is at 183.9–85*0.499=141.48, and the rightmost Mel-frequency point is at 2060.8±85*0.499=2103.2. The corresponding points in the linear frequency scale are respectively 93.6 Hz and 3824.6 Hz. One way to handle frequencies not covered by the IDCT frequency range is to use the nearest frequency point, i.e., frequencies below 93.6 Hz are assigned the frequency point at 93.6 Hz, and similarly frequencies above 3824.6 Hz are assigned the frequency point at 3824.6 Hz. An alternate method is to use some type of interpolation.

The higher resolution IDCT essentially interpolates between the Mel-frequency band centers using the DCT basis functions themselves as the interpolating functions. However, it is not necessary to perform a 3933-point IDCT. Instead, to facilitate computation of the IDCT at selected frequency points, a 12×3933 matrix L of IDCT values may be optionally pre-computed at a step 118 using the equation:

$$L_{i,j} = \left(\frac{2}{23}\right)\cos\left(\frac{(2j+1)*i*\pi}{2*23*171}\right),$$

where i=1, 2, . . . , 12 and j=0, 1, . . . , 3932. The zeroth row corresponding to C0 is implicit and need not be stored since its value is constant at 1/23 for all columns. The rows corresponding to C13 through C22 need not be stored as these coefficients are unavailable and assumed to be zero.

Given this matrix L, to get the log-spectral value at any given Mel-frequency, the nearest Mel-frequency point for which the IDCT has been calculated is located, the corresponding column vector of the matrix L is selected, and an inner product between the corresponding column and the modified MFCC vector [C0, C1, . . . , C12] is formed. Consequently, to determine the log-spectral values for the harmonic frequencies, for example, the nearest mel-frequency points are located and the corresponding column vectors of the matrix L selected at the step 114. Further, at the step 116, the inner products are formed between the modified MFCC vector and the column vectors of matrix L selected at the step 114.

The transformed coefficients are then exponentiated to compute the spectral magnitudes at a step 120.

The sinusoidal speech vocoder-synthesizer 98 uses these spectral magnitudes, along with the data regarding the frame energy and other data (such as class, pitch period, and sub-frame energy) also extracted by the DSR/speech processor 92 under the control of the afore-mentioned program, to reconstruct the speech as the sum of a number of sinusoidal signals with different frequencies, amplitudes, and phases. In particular, the synthesizer reconstructs speech using a sinusoidal model of speech production:

$$s(j) = \sum_k A_{k,j} \cos(\Phi_{k,j})$$

where the speech sample s(j) is synthesized as the sum of a number of harmonically related sinusoids with amplitude A and phase ☐, j being the sample index and k being the harmonic index.

Typically, the synthesis process starts with the computation of the frequencies, amplitudes, and phases at the midpoint of each frame. The frequencies used are the pitch frequency and its harmonics, which can be computed using the pitch period. The amplitudes used may be the harmonic amplitudes, which may be estimated using the spectral amplitudes determined using the method discussed above and the sub-frame energy corresponding to the midpoint of the frame (or an interpolation thereof using the log-energy value). Alternatively, for unvoiced speech for example, the amplitudes may correspond to a set of frequencies not necessarily identical to the harmonic frequencies, in which case these amplitudes may be estimated using the general form of the method described above and the sub-frame energy corresponding to the midpoint of the frame (or an interpolation thereof using the log-energy value). The phases computed depend on the class parameter. For voiced speech, coherent phases are computed. For unvoiced speech, random, non-coherent, phases are computed. For mixed-voiced speech, the voiced model is used for lower frequencies and the unvoiced model is used for higher frequencies. Any linear phase component is removed from the modeled phases.

Once the midpoint frequency, amplitude and phase values are known, the amplitudes and phases at other points may be calculated. For example, once the amplitudes at the midpoints of the current and previous voiced frames are known, the amplitudes at the sub-frame boundaries may be calculated using linear interpolation with an adjustment for the energies at these points. Amplitudes within a sub-frame may also be calculated using linear interpolation. The harmonic phases at different sample indices may be calculated by allowing the phases to evolve linearly according to the frequency. The frequencies are allowed to change at the sub-frame boundaries in equal steps from the previous values to the current values. Any phase discontinuities arising out of this evolution are resolved using linear phase correction factors (i.e., slight frequency shifts). If the previous and current frames are of different classes (e.g., one is voiced and the other is unvoiced) or both are voiced but the pitch periods are quite different, e.g., doubling, the two frames are synthesized independently and overlap-added in the time-domain.

EXAMPLE 1

A speech database, sampled at 8 kHz, pre-processed with a m-IRS filter, and consisting of 32 sentence pairs (4 males+4 females, 4 sentence pairs each) was used. The original harmonic magnitudes were obtained for each voiced frame (20 ms long) by first estimating the pitch period to determine the harmonic frequencies and then extracting the magnitudes at these frequencies from a 256-point FFT of Hamming windowed speech. The DSR encoding method described above was then completed to calculate the MFCC vectors. The method according to the present invention also described above was then used to estimate the harmonic magnitudes for each 20 ms frame from every other MFCC vector. The average distortion D over N voiced frames was computed as:

$$D = \frac{1}{N}\sum_{n=1}^{n=N} Dn$$

where the distortion for the $n^{th}$ frame is given by the equation:

$$Dn = \sqrt{\frac{1}{Ki}\sum_{k=1}^{k=Ki}\left[20*\log_{10}(M_{k,n}) - 20*\log_{10}(\tilde{M}_{k,n})\right]}$$

where K is the number of harmonics, and $M_{k,n}$ and $\overline{M}_{k,n}$ are the original and estimated harmonic magnitudes respectively. For each frame, the original and estimated magnitudes were first normalized such that their log-mean was zero.

The results are shown in Table 1, wherein the effects of quantization and truncation are also presented.

TABLE 1

| Input parameters used | Distortion in dB (N = 4768) |
|---|---|
| 13 MFCC values (quantized) | 4.64 |
| 13 MFCC values (unquantized) | 4.33 |
| 23 MFCC values (unquantized) | 3.80 |

EXAMPLE 2

To evaluate the quality of the method according to the present invention, a subjective Mean-Opinion-Score (MOS) test was also performed. The same speech database that was used in Example 1 was used for this purpose. A total of 32 conditions were included in the test. Several MNRU conditions and coding standards were included to serve as references and to ensure that the entire range of quality level was spanned. A group of 32 naïve listeners was used to evaluate the speech quality based on a 5-point scale: Bad (1), Poor (2), Fair (3), Good (4), and Excellent (5). The test was conducted in a soundproof room and the speech samples were presented through a headphone mono-aurally.

The MOS numbers (averaged over 256 votes) are as follows: The original uncoded speech scored 4.32. The G726 (32 Kbps ADPCM) and the G729 (8 Kbps CS-ACELP) standards scored respectively 3.65 and 3.89. The MELP vocoder (2400 bps Federal standard) scored 2.93. A conventional 2400 bps vocoder (modeling the magnitudes using a $14^{th}$ order all-pole model with the model parameters (line spectral frequencies) quantitized using a 4-split VQ) and its 20 ms variation at 2700 bps scored 3.11 and 3.15 respectively. By comparison, an embodiment of the present invention using data regarding sub-frame energy levels to reconstruct the speech scored 2.43, while an embodiment not using data regarding sub-frame energy levels scored 2.26.

Besides quality, intelligibility was also evaluated. To evaluate intelligibility, a (limited) Diagnostic Rhyme Test (DRT) was performed. Standard DRT test words spoken by 2 speakers (1 male and 1 female) and 8 (untrained) listeners were used in the test. The test was conducted in a soundproof room and the speech samples were presented through a headphone mono-aurally.

The (averaged) overall intelligibility score for the 20 ms version of the conventional vocoder (2700 bps) was found to be 88. By comparison, The score for the embodiment using sub-frame energy levels was found to be 82.8.

The conclusion that may be drawn from Examples 1 and 2 is that the reconstructed speech is of reasonable quality and quite intelligible.

In summary, the system, method and apparatuses according to the present invention provide several advantages over standard ASR and DSR. Unlike ASR, the system, method and apparatuses according to the present invention overcome the distortion levels caused by transmitted speech. Unlike DSR, the system, method and apparatuses according to the present invention make reconstructed speech available for storage and/or verification. Moreover, the system, method and apparatuses according to the present invention makes this reconstructed speech available according to a preferred embodiment of the invention by increasing the data transmission rate by no more than about 10% to 20%. That is, by taking advantage of the data already coded as part of the DSR process, the system, method and apparatuses according to the present invention minimizes the additional data necessary to be transmitted to provide reconstructed speech at the back end.

Other aspects, objects, and advantages of the present invention will be obtained from a study of the specification, drawings and appended claims.

We claim:

1. In a distributed speech recognition system comprising a first communication device which receives a speech input and a second communication device remotely located from the first communication device and communicatively coupled to the first communication device, a method of reconstructing the speech input at the second communication device comprising the steps of:

receiving at the second communication device of the distributed speech recognition system encoded data sent by the first communication device of the distributed speech recognition system, the encoded data including encoded spectral data and encoded energy data;

selectively at the second communication device decoding the encoded spectral data and encoded energy data to determine the spectral data and energy data and extracting a speech recognition parameter from the encoded data; and selectively combining the spectral data and energy data to reconstruct the speech input at the second communication device and matching the speech recognition parameter with a speech recognition data set.

2. The method of reconstructing the speech input according to claim 1, wherein the receiving step comprises the step of receiving encoded data including spectral data encoded as a series of mel-frequency cepstral coefficients.

3. The method of reconstructing the speech input according to claim 2, wherein the speech input has a pitch period and the decoding step comprises the steps of:

determining harmonic mel-frequencies corresponding to the pitch period;

performing an inverse discrete cosine transform on the mel-frequency cepstral coefficients at the harmonic mel-frequencies to determine log-spectral magnitudes of the speech input at the harmonic mel-frequencies; and exponentiating the log-spectral magnitudes to determine the spectral magnitudes of the speech input.

4. The method of reconstructing the speech input according to claim 3, wherein the step of performing the inverse discrete cosine transform comprises the steps of:

determining a matrix comprising a plurality of column vectors, each column vector corresponding to one of a plurality of mel-frequencies;

selecting a column vector from the matrix corresponding to one of the plurality of mel-frequencies closest in value to one of the harmonic mel-frequencies; and forming an inner product between a row vector formed from the series of mel-frequency cepstral coefficients and the selected column vector.

5. The method of reconstructing the speech input according to claim 2, wherein the decoding step comprises the steps of:

determining mel-frequencies corresponding to a set of frequencies; and performing an inverse discrete cosine transform on the mel-frequency cepstral coefficients at the mel-frequencies to determine log-spectral magnitudes of the speech input at the mel-frequencies.

6. The method of reconstructing the speech input according to claim 1, wherein:

the receiving step comprises the step of receiving encoded data including encoded additional excitation data;

the decoding step comprises the step of decoding the encoded additional excitation data to determine the additional excitation data; and the combining step comprises the step of combining the spectral, energy and excitation data to reconstruct the speech input.

7. The method of reconstructing the speech input according to claim 6, wherein the decoding step comprises the step of decoding the encoded additional excitation data to determine a pitch period and a voice class.

8. In a distributed speech recognition system comprising a first communication device which receives a speech input, encodes data representative of the speech input, and transmits the encoded data and a second remotely-located communication device which receives the encoded data and compares the encoded data with a known data set, a method of reconstructing the speech input at the second communication device comprising the steps of:

receiving encoded data including encoded spectral data spectral data encoded as a series of mel-frequency cepstral coefficients and encoded energy data;

performing an inverse discrete cosine transform on the mel-frequency cepstral coefficients at harmonic mel-frequencies corresponding to a pitch period of the speech input to determine log-spectral magnitudes of the speech input at the mel-harmonic frequencies; and exponentiating the log-spectral magnitudes to determine the spectral magnitudes of the speech input;

decoding the encoded energy data to determine the energy data; and combining the spectral magnitudes and the energy data to reconstruct the speech input.

9. The method of reconstructing the speech input according to claim 8, wherein the step of performing the inverse discrete cosine transform comprises the steps of:

determining a matrix comprising a plurality of column vectors, each column vector corresponding to one of a plurality of mel-frequencies;

selecting a column vector from the matrix corresponding to one of the plurality of mel-frequencies closest in value to one of the harmonic mel-frequencies; and forming an inner product between a row vector formed from the series of mel-frequency cepstral coefficients and the selected column vector.

10. The method of reconstructing the speech input according to claim 8, further comprising the step of comparing the series of mel-frequency cepstral coefficients to a series of mel-frequency cepstral coefficients corresponding to an impulse response.

11. The method of reconstructing the speech input according to claim 10, wherein the step of comparing comprises the step of subtracting a series of mel-frequency cepstral coefficients corresponding to an impulse response of a pre-emphasis filter from the series of mel-frequency cepstral coefficients.

12. The method of reconstructing the speech input according to claim 8, wherein the speech input is divided into a series of frames and:

the step of receiving encoded data comprises the step of receiving encoded energy data including a natural logarithm of an average energy value for each frame in the series of frames; and the step of decoding the encoded energy data comprises the step of exponentiating the natural logarithm of the average energy value for each frame in the series of frames.

13. The method of reconstructing the speech input according to claim 8, wherein:

the receiving step comprises the step of receiving encoded data including encoded additional excitation data;

the decoding step comprises the step of decoding the encoded additional excitation data to determine the additional excitation data; and the combining step comprises the step of combining the spectral, energy and excitation data to reconstruct the speech input.

14. The method of reconstructing the speech input according to claim 13, wherein the decoding step comprises the step of decoding the encoded excitation data to determine a pitch period and a voice class.

15. The method of reconstructing the speech input according to claim 14, wherein the decoding step includes the step of decoding the encoded excitation data to determine sub-frame energy data.

16. The method of reconstructing the speech input according to claim 8, wherein the step of performing an inverse discrete cosine transform includes the step of performing an inverse discrete cosine transform of higher resolution than a discrete cosine transform used to encode the spectral data as a series of mel-frequency cepstral coefficients.

17. In a distributed speech recognition system comprising a first communication device which receives a speech input, encodes data about the speech input, and transmits the encoded data and a second remotely-located communication device which receives the encoded data and compares the encoded data with a known data set, the second remotely-located communication device comprising:

a processor including a program which controls the processor (i) to receive the encoded data including encoded spectral data spectral data encoded as a series of mel-frequency cepstral coefficients and encoded energy data, (ii) to perform an inverse discrete cosine transform on the mel-frequency cepstral coefficients at harmonic mel-frequencies corresponding to a pitch period of the speech input to determine log-spectral magnitudes of the speech input at the harmonic frequencies, (iii) to exponentiate the log-spectral magnitudes to determine the spectral magnitudes of the speech input, and (iv) to decode the encoded energy data to determine the energy data; and a speech synthesizer which combines the spectral magnitudes and the energy data to reconstruct the speech input.

18. The communication device according to claim 17, wherein the program further controls the processor (i) to determine a matrix comprising a plurality of column vectors, each column vector corresponding to one of a plurality of mel-frequencies, (ii) to select a column vector from the matrix corresponding to one of the plurality of mel-frequencies closest in value to one of the harmonic mel-frequencies, and (iii) to form an inner product between a row vector formed from the series of mel-frequency cepstral coefficients and the selected column vector so as to perform the inverse discrete cosine transform.

19. The communication device according to claim 18, wherein the program further controls the processor to subtract a series of mel-frequency cepstral coefficients corresponding to an impulse response from the series of mel-frequency cepstral coefficients before performing the inverse discrete cosine transform.

20. The communication device according to claim 17, wherein the speech input is divided into a series of frames and the program further controls the processor (i) to receive encoded energy data including a natural logarithm of an average energy value for each frame in the series of frames, and (ii) to exponentiate the natural logarithm of the average energy value for each frame in the series of frames to determine the energy data.

21. The communication device according to claim 17, wherein:

the program further controls the processor (i) to receive encoded data including encoded additional excitation data, and (ii) to decode the encoded additional excitation data to determine a pitch period and a voice class, and the speech synthesizer combines the spectral magnitudes, energy data, pitch period and voice class to reconstruct the speech input.

22. The communication device according to claim 21, wherein the speech synthesizer comprises a sinusoidal vocoder-synthesizer.

* * * * *